United States Patent
Bersenev (10) Patent No.: US 7,504,802 B2
(45) Date of Patent: Mar. 17, 2009

(54) PORTABLE ELECTRONIC DEVICE AND CAPACITIVE CHARGER THEREFOR AND ASSOCIATED METHODS

(75) Inventor: Alexander I. Bersenev, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 456 days.

(21) Appl. No.: 11/051,581

(22) Filed: Feb. 4, 2005

(65) Prior Publication Data

US 2006/0176015 A1    Aug. 10, 2006

(51) Int. Cl.
H02J 7/00    (2006.01)

(52) U.S. Cl. .................................................. 320/108

(58) Field of Classification Search .......... 320/106–108
See application file for complete search history.

(56) References Cited

U.S. PATENT DOCUMENTS

| | | | | |
|---|---|---|---|---|
| 4,688,097 | A * | 8/1987 | Lin | 380/225 |
| 5,276,311 | A | 1/1994 | Hennige | 235/380 |
| 5,519,262 | A | 5/1996 | Wood | 307/104 |
| 5,525,843 | A | 6/1996 | Höwing | 307/9.1 |
| 5,600,225 | A * | 2/1997 | Goto | 320/108 |
| 5,682,032 | A | 10/1997 | Philipp | 235/422 |
| 5,847,447 | A | 12/1998 | Rozin et al. | 257/678 |
| 5,923,544 | A | 7/1999 | Urano | 363/22 |
| 6,067,368 | A | 5/2000 | Setlak et al. | 382/124 |
| 6,173,899 | B1 | 1/2001 | Rozin | 235/492 |
| 6,184,651 | B1 | 2/2001 | Fernandez et al. | 320/108 |
| 6,184,652 | B1 | 2/2001 | Yang | 320/110 |
| 6,275,681 | B1 | 8/2001 | Vega et al. | 455/41 |
| 6,282,407 | B1 | 8/2001 | Vega et al. | 455/41 |
| 6,331,744 | B1 | 12/2001 | Chen et al. | 310/171 |
| 6,362,610 | B1 | 3/2002 | Yang | 323/281 |

(Continued)

FOREIGN PATENT DOCUMENTS

DE    19519881    7/1996

(Continued)

OTHER PUBLICATIONS

"Wireless Combo Set has Built-in Battery Charger", Shenzhen Harma Technology Co. Ltd., Sep. 28, 2004, Global Sources, China Sourcing Fair, available at www.globalsources.com/gsol/l/Computer-RF/a/9000000056533.htm.

Primary Examiner—Akm E Ullah
Assistant Examiner—Samuel Berhanu
(74) Attorney, Agent, or Firm—Allen, Dyer, Doppelt, Milbrath & Gilchrist, P.A.

(57) ABSTRACT

An electronic apparatus includes a portable electronic device and a charger for capacitively charging the portable electronic device when the portable electronic device is temporarily placed adjacent the charger. The portable electronic device includes a housing, a battery carried by the housing, and at least one pair of device capacitive electrodes carried by the housing for charging the battery and defining a device conductive footprint. The charger includes a base having an area larger than the device conductive footprint, and an array of charger capacitive electrodes carried by the base. The charger further includes a charger controller for selectively driving the charger capacitive electrodes within the device conductive footprint with a charging signal sufficient to capacitively charge the battery of the portable electronic device and not driving charger capacitive electrodes outside the device conductive footprint.

16 Claims, 5 Drawing Sheets

U.S. PATENT DOCUMENTS

| | | | |
|---|---|---|---|
| 6,380,711 B2 | 4/2002 | Fischer et al. | 320/106 |
| 6,614,206 B1 | 9/2003 | Wong et al. | 320/136 |
| 6,756,765 B2 | 6/2004 | Bruning | 320/108 |
| 6,803,744 B1 * | 10/2004 | Sabo | 320/108 |
| 2002/0038432 A1 | 3/2002 | Hsu | 713/300 |
| 2003/0091118 A1 | 5/2003 | Lohr | 375/258 |
| 2004/0212344 A1 | 10/2004 | Tamura et al. | 320/114 |
| 2005/0017676 A1 * | 1/2005 | Takimoto et al. | 320/107 |

FOREIGN PATENT DOCUMENTS

| | | |
|---|---|---|
| DE | 10026174 | 10/2001 |
| GB | 2198601 | 6/1998 |
| GB | 2389720 A * | 12/2003 |
| WO | WO01/92900 | 12/2001 |

* cited by examiner

PORTABLE ELECTRONIC DEVICE AND CAPACITIVE CHARGER THEREFOR AND ASSOCIATED METHODS

FIELD OF THE INVENTION

The invention relates to the field of portable electronic devices, and, more particularly, to portable electronic devices and battery chargers therefor and associated methods.

BACKGROUND OF THE INVENTION

Rechargeable batteries are used to power many of today's portable electronic devices. Rechargeable batteries make the portable electronic device more mobile than a device requiring a plug-in power source and this generally adds convenience for the user. However, recharging the batteries for a portable electronic device may be an inconvenience to the user.

For example, a rechargeable battery may carry a limited charge and therefore a user may have to monitor the charge level. Also, a user may have to make arrangements to provide for the charging of the batteries such as by carrying chargers and/or power cords.

Compounding these inconveniences for the user is the potential increased power consumption by modern portable electronic devices. Most portable electronic devices provide more functionality than their predecessors, which usually results in increased power consumption. This means more frequent recharging of the batteries of the portable electronic device, which may result in more recharging inconvenience for the user.

A number of attempts have been made to address recharging for portable electronic devices. For instance, U.S. Pat. No. 6,756,765 to Bruning discloses a system for the contactless recharging of a portable device. The system includes a capacitive plate in a pad onto which the portable device is placed for recharging.

Similarly, U.S. Pat. No. 6,275,681 to Vega et al. discloses a system that includes capacitively coupled capacitor plates for generating an electrostatic field for electrostatic charging of a device like a smart card. The system also includes a charge controller in the rechargeable device for controlling the charging of the battery in the rechargeable device. Another patent to Vega et al. is U.S. Pat. No. 6,282,407, which discloses active and passive electrostatic transceivers that include capacitive charging plates for electrostatically charging. The system also includes an electrostatic reader that continuously generates and transmits an excitation signal to the medium surrounding the reader. In both of the Vega et al. patents, an embodiment is disclosed where a user can manually activate the electrostatic reader instead of having the reader radiating continuously.

Unfortunately for some of the above devices, a user may still need to monitor the charge level of the battery in his portable electronic device. In addition, some of the above devices may require the user to precisely align the electrodes of the charging device with the electrodes in the device being charged. Undesired electromagnetic interference (EMI) may also be generated by capacitive charging arrangements.

SUMMARY OF THE INVENTION

In view of the foregoing background, it is therefore an object of the invention to provide an electronic apparatus and method for conveniently charging a portable electronic device battery while reducing undesired electromagnetic interference.

This and other objects, features, and advantages in accordance with the invention are provided by an electronic apparatus including a portable electronic device and a charger for capacitively charging the portable electronic device when the portable electronic device is temporarily placed adjacent the charger. The portable electronic device may include a housing, a battery carried by the housing, and at least one pair of device capacitive electrodes carried by the housing for charging the battery and defining a device conductive footprint. The charger may include a base having an area larger than the device conductive footprint and which is able to receive the portable electronic device thereon in a plurality of different positions, and an array of charger capacitive electrodes carried by the base. The charger may further include a charger controller for selectively driving the charger capacitive electrodes within the device conductive footprint with a charging signal sufficient to capacitively charge the battery of the portable electronic device. The charger controller may not drive charger capacitive electrodes outside the device conductive footprint with the charging signal when the portable electronic device is positioned on the charger. Accordingly, the charger may conveniently and capacitively charge the battery of the portable electronic device while reducing undesired electromagnetic interference (EMI). This is so since the device capacitive electrodes absorb the energy from the underlying driven charger capacitive electrodes.

The charger controller may sense impedances of the charger capacitive electrodes to determine whether a respective charger capacitive electrode is within the device conductive footprint or not. The charger controller may sequentially drive the charger capacitive electrodes with a sensing signal to sense impedances thereof. The charging signal may have an amplitude at least one hundred times greater than an amplitude of the sensing signal. This also ensures efficient charging while reducing undesired EMI.

The charger controller may comprise a charging signal generator, a switching circuit connected between the charging signal generator and the charger capacitive electrodes, and a control circuit connected to the switching circuit. The charger controller may further comprise a buffer connected between the charging signal generator and the switching circuit, and an impedance detector connected to the buffer and the control circuit.

The control circuit may operate the charging signal generator at a reduced amplitude to serve as a signal generator for the sensing signal. The charger controller and the portable electronic device may also communicate via the charger capacitive electrodes, such as indicate that the battery needs charging or is fully charged.

A method aspect of the invention is for capacitively charging a portable electronic device with a charger. The portable electronic device may include a housing, a battery carried by the housing, and at least one pair of device capacitive electrodes carried by the housing for charging the battery and defining a device conductive footprint. The charger may include a base having an area larger than the device conductive footprint and able to receive the portable electronic device thereon in a plurality of different positions, an array of charger capacitive electrodes carried by the base, and a charger controller connected to the charger capacitive electrodes. The method may include temporarily placing the portable electronic device adjacent the charger, and selectively driving, via the charger controller, the charger capacitive electrodes within the device conductive footprint with a charging signal sufficient to capacitively charge the battery of the portable electronic device, and not driving charger capacitive electrodes outside the device conductive footprint with the charging signal.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Additionally, like numbers are used to refer to like elements throughout the drawings.

Figure 1:
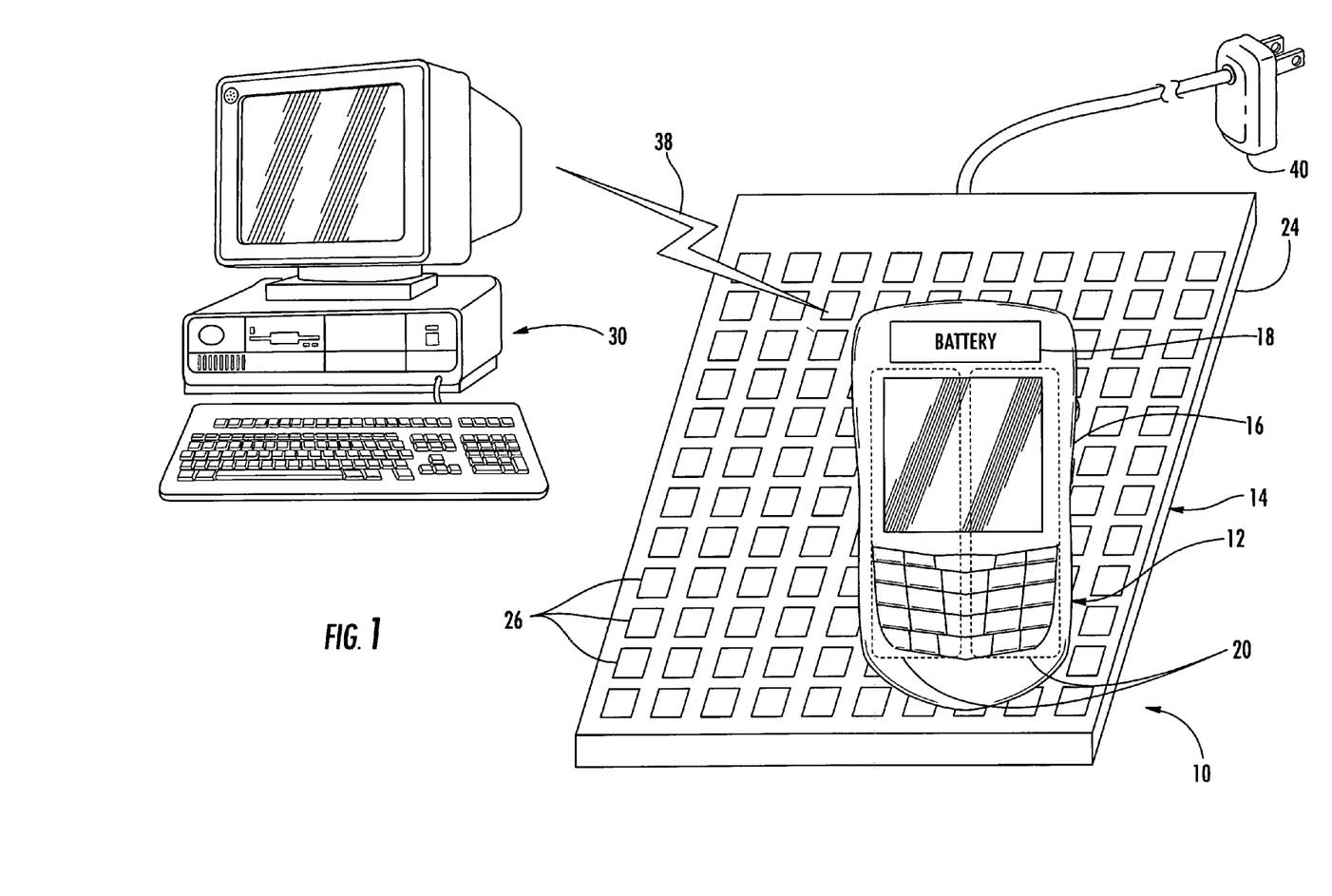
FIG. 1 is a schematic perspective view of the electronic apparatus for charging a portable electronic device in a typical work environment according to the invention.
Figure 2:
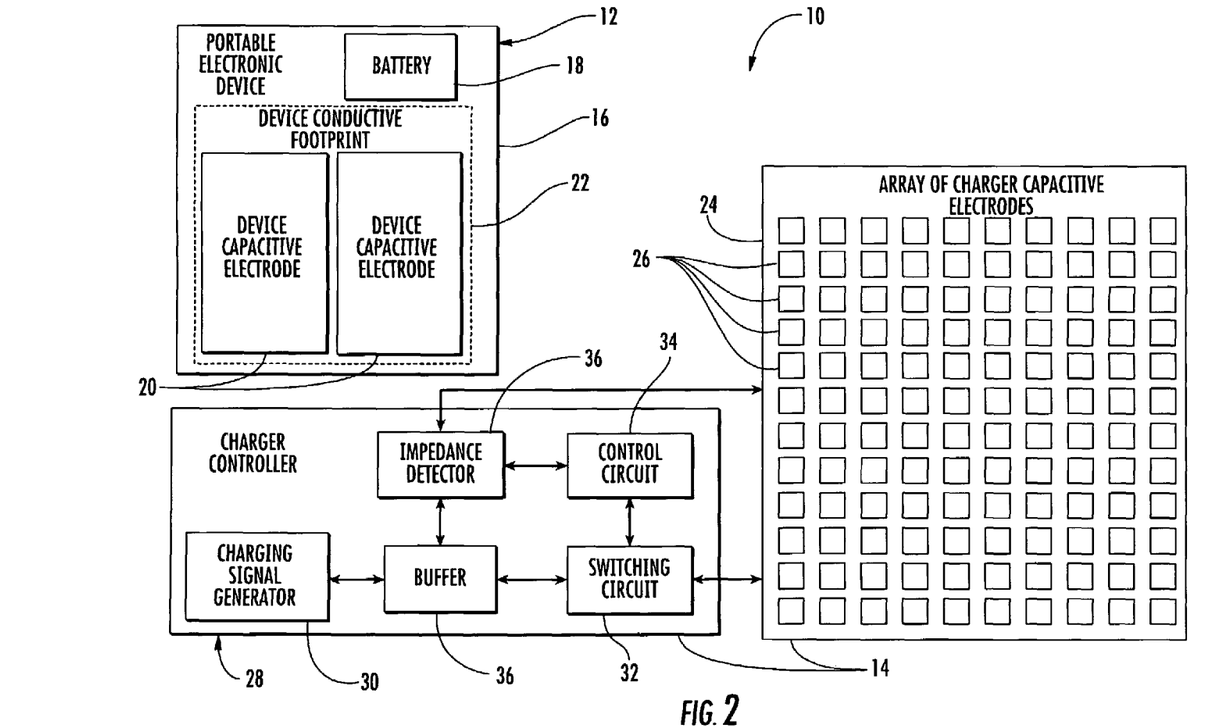
FIG. 2 is a block diagram of the electronic apparatus as shown in FIG. 1.
Figure 3:
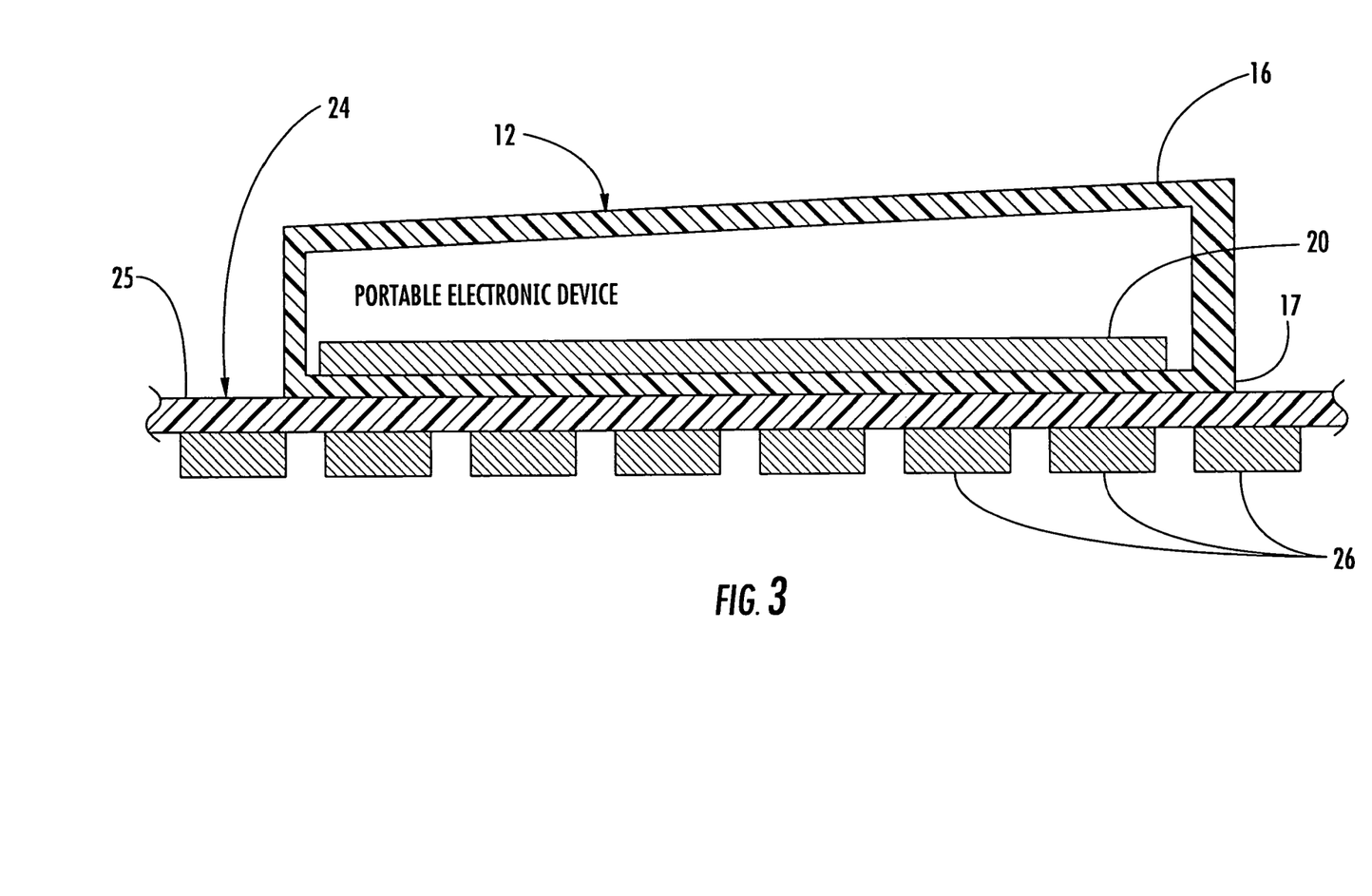
FIG. 3 is a schematic cross-sectional view of the electronic apparatus as shown in FIG. 1.

Referring initially to FIGS. 1-3, an electronic apparatus 10 including a portable electronic device 12 and a charger 14 for capacitively charging the portable electronic device is now described. The portable electronic device 12 illustratively includes a housing 16, a battery 18 carried by the housing, and a pair of device capacitive electrodes 20 carried by the housing for charging the battery and defining a device conductive footprint 22. The housing 16 may further include a housing dielectric layer 17 adjacent the device capacitive electrodes 20. The device capacitive electrodes 20 are arranged in closely spaced, side-by-side relation. In other embodiments, more than one pair of device electrodes 20 may be provided and/or these electrodes can be arranged in different configurations as will be appreciated by those skilled in the art.

The charger 14 illustratively includes a base 24 having an area larger than the device conductive footprint 22 and able to receive the portable electronic device 12 thereon in a plurality of different positions. The charger 14 may also include and an array of charger capacitive electrodes 26 and a base dielectric layer 25 carried by the base 24. The charger 14 further includes, for example, a charger controller 28 for selectively driving the charger capacitive electrodes 26 within the device conductive footprint 22 with a charging signal sufficient to capacitively charge the battery 18 of the portable electronic device 12, and not driving charger capacitive electrodes outside the device conductive footprint with the charging signal when the portable electronic device is positioned on the charger 14 to thereby capacitively charge the battery of the portable electronic device while reducing undesired (EMI).

To help control the undesired EMI, the charger controller 28 selectively drives the charger capacitive electrodes 26 within the device conductive footprint 22 with a charging signal while not driving the charger capacitive electrodes outside the device conductive footprint. In other words, because the charger capacitive electrodes 26 being driven by the charging signal are covered by the device capacitive electrodes 20, the device capacitive electrodes function as an EMI shield as will be appreciated by those skilled in the art. As a result, for example, a communication link 38 between the portable electronic device 12 and the computer 30 will be less likely to be disrupted by the operation of charger 14.

The charger controller 28 may sense impedances, for example, of the charger capacitive electrodes 26 to determine whether a respective charger capacitive electrode is within the device conductive footprint 22 or not. Such sensing permits the charger controller 28 to accommodate the portable electronic device 12 if it is moved across the array of charger capacitive electrodes 26. The charger controller 28 may sequentially drive the charger capacitive electrodes 26 with a sensing signal to sense impedances thereof as will be appreciated by those skilled in the art. To further reduce EMI while providing efficient charging, the charging signal may have an amplitude at least one hundred times greater than an amplitude of the sensing signal, for example.

The charger controller 28 illustratively comprises a charging signal generator 30, a switching circuit 32 connected between the charging signal generator and the charger capacitive electrodes 26, and a control circuit 34 connected to the switching circuit. The charger controller 28 further comprises a buffer 36 connected between the charging signal generator 30 and the switching circuit 32, and an impedance detector 36 connected to the buffer and the control circuit 34. The control circuit 28 may preferably operate the charging signal generator 30 at a reduced amplitude to serve as a signal generator for the sensing signal, for example.

The charger controller 28 and the portable electronic device 12 can also communicate via the charger capacitive electrodes 26 such as to indicate the state of charge of the battery 18. The charger 14 is illustratively powered through a wall transformer 40. In other embodiments, the charger 14 can be powered by the computer 30 or other devices as will be appreciated by those skilled in the art.

The control circuit 34 determines which charger capacitive electrodes 26 are within the device conductive footprint 22 by operating the charging signal generator 30 to generate a sensing signal. The impedance detector 36 senses a first impedance when a charger capacitive electrode 26 is within the device conductive footprint 22, and senses a second impedance when a charger capacitive electrode 26 is not. This sensing data is communicated to the control circuit 34.

The control circuit 34 uses this data to selectively drive the charger capacitive electrodes 26 within the device conductive footprint 22 with the charging signal, which may be about 1 MHz, for example. The charging signal generator 30 generates the charging signal, which is relayed to the buffer 36. The buffer 36 may be a differential buffer, for example, that generates the charging signal to have two components that are substantially 180 degrees out of phase with each other. The switching circuit 32 receives the charging signal and selects which device capacitive electrodes 20 receive the charging signal. The device capacitive electrodes 20 capacitively receive the charging signals to a charging circuit within the housing 16, as will be appreciated by those skilled in the art, and the charging circuit charges the battery 18.

Figure 4:
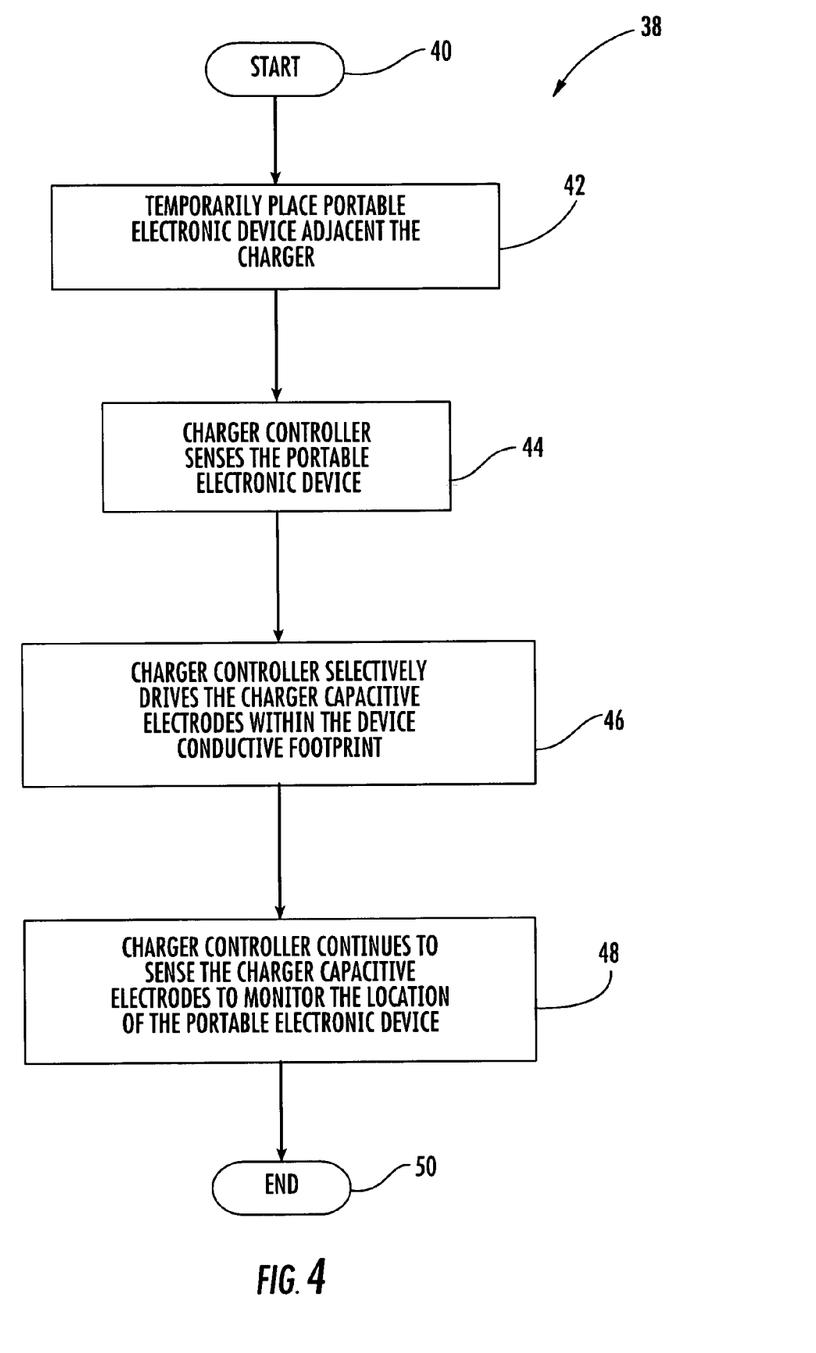
FIG. 4 is a flow chart illustrating a method according to the invention.

Referring now additionally to the flowchart 38 shown in FIG. 4, a method aspect of the invention is now described. The method is for capacitively charging the portable electronic device 12 with the charger 14. The portable electronic device 12 includes a housing 16, a battery 18 carried by the housing, and at least one pair of device capacitive electrodes 20 carried by the housing for charging the battery and defining a device conductive footprint 22. The charger 14 includes a base 24 having an area larger than the device conductive footprint 22 and able to receive the portable electronic device 12 thereon in a plurality of different positions, an array of charger capacitive electrodes 26 carried by the base, and a charger controller 28 connected to the charger capacitive electrodes. The method starts at Block 40 and includes temporarily placing the portable electronic device 12 adjacent the charger 14 at Block 42. The charger controller 28 senses the portable electronic device 12 at Block 44. The charger controller then selectively drives, at Block 46, the charger capacitive electrodes 26 within the device conductive footprint 22 with a charging signal sufficient to capacitively charge the battery 18 of the portable electronic device 12 and not driving charger capacitive electrodes outside the device conductive footprint with the charging signal to thereby capacitively charge the battery of the portable electronic device while reducing undesired EMI. The charger controller 28 continues to sense the charger capacitive electrodes 26 to monitor the location of the portable electronic device at Block 48 and the method ends at Block 50.

An example of the portable electronic device 12 is a handheld mobile wireless communications device 1000 that may be used in accordance with the invention is further described with reference to FIG. 5. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 5:
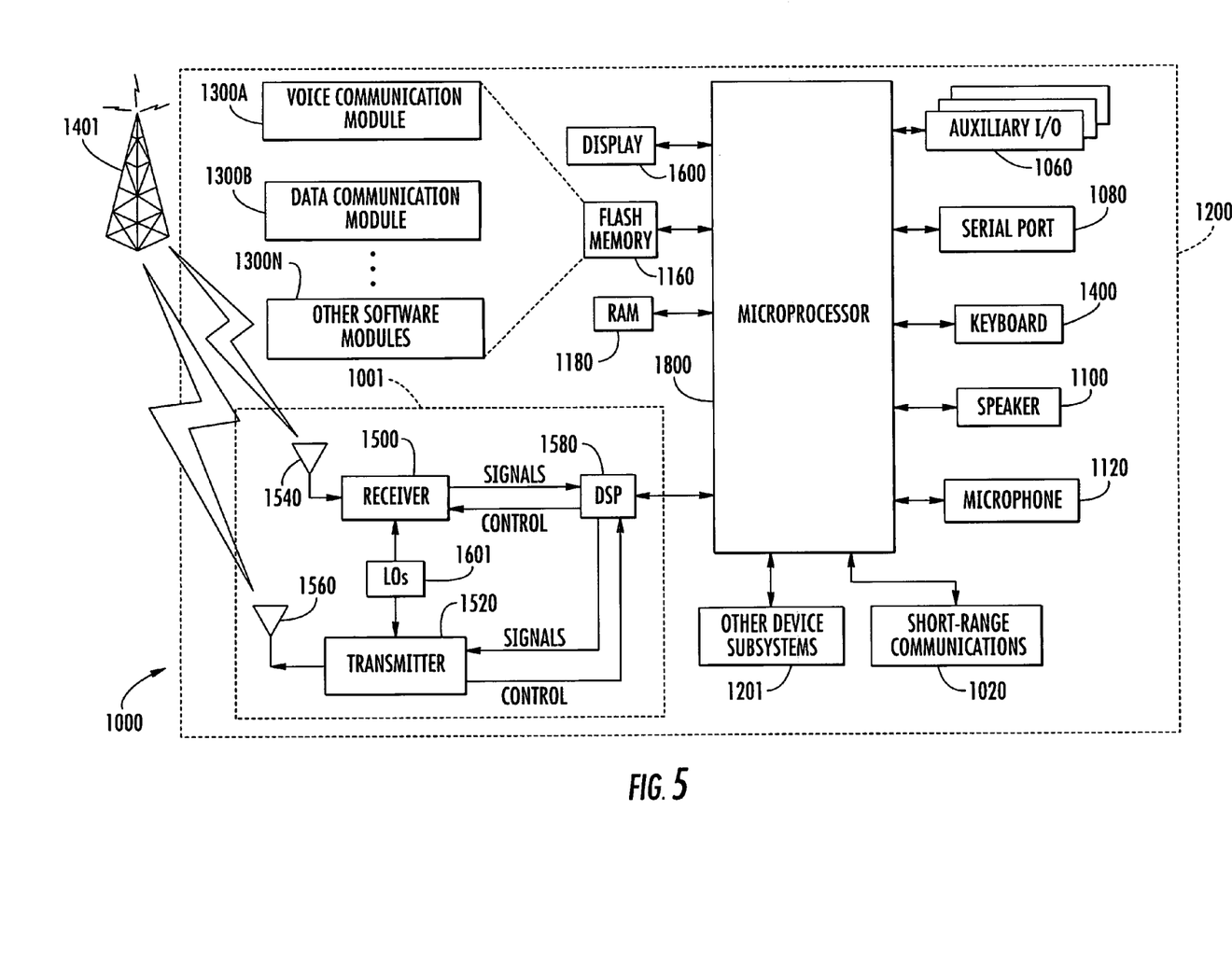
FIG. 5 is a more detailed schematic block diagram of an embodiment of a portable electronic device.

In addition to the processing device 1800, other parts of the mobile device 1000 are shown schematically in FIG. 5. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An electronic apparatus comprising:
   a portable electronic device and a charger for capacitively charging said portable electronic device when said portable electronic device is temporarily placed adjacent said charger;
   said portable electronic device comprising a housing, a battery carried by the housing, and at least one pair of device capacitive electrodes carried by said housing for charging said battery and defining a device conductive footprint;
   said charger comprising
   a base having an area larger than the device conductive footprint and able to receive said portable electronic device thereon in a plurality of different positions,
   an array of charger capacitive electrodes carried by said base, and
   a charger controller including a charging signal generator, a switching circuit connected between said charging signal generator and said charger capacitive electrodes, a control circuit connected to said switching circuit, and an impedance detector connected to said control circuit;
   the charger controller for selectively driving said charger capacitive electrodes within the device conductive footprint with a charging signal sufficient to capacitively charge said battery of said portable electronic device and not driving charger capacitive electrodes outside the device conductive footprint with the charging signal when said portable electronic device is positioned on said charger to thereby capacitively charge said battery of said portable electronic device while reducing undesired electromagnetic interference (EMI), and with
   the impedance detector sensing impedances based upon charger capacitive electrodes being within the device conductive footprint and communicating sensing data based thereon to said control circuit, and
   the control circuit using the sensing data to control said switching circuit to select the device capacitive electrodes to receive a charging signal from said charging signal generator.

2. The electronic apparatus according to claim 1 wherein said charger controller sequentially drives said charger capacitive electrodes with a sensing signal to sense impedances thereof.

3. The electronic apparatus according to claim 2 wherein the charging signal has an amplitude at least one hundred times greater than an amplitude of the sensing signal.

4. The electronic apparatus according to claim 2 wherein said control circuit operates said charging signal generator at a reduced amplitude to serve as a signal generator for the sensing signal.

5. The electronic apparatus according to claim 1 wherein said charger controller and said portable electronic device also communicate via said charger capacitive electrodes.

6. A charger for capacitively charging a portable electronic device when the portable electronic device is temporarily placed adjacent the charger, the portable electronic device comprising a housing, a battery carried by the housing, and at least one pair of device capacitive electrodes carried by the housing for charging the battery and defining a device conductive footprint, the charger comprising:
   a base having an area larger than the device conductive footprint and able to receive the portable electronic device thereon in a plurality of different positions;
   an array of charger capacitive electrodes carried by said base; and
   a charger controller including a charging signal generator, a switching circuit connected between said charging signal generator and said charger capacitive electrodes, a control circuit connected to said switching circuit, a buffer connected between said charging signal generator and said switching circuit, and an impedance detector connected to said buffer and said control circuit;
   the charger controller for selectively driving said charger capacitive electrodes within the device conductive footprint with a charging signal sufficient to capacitively charge the battery of the portable electronic device and not driving charger capacitive electrodes outside the device conductive footprint with the charging signal when the portable electronic device is positioned on said charger to thereby capacitively charge the battery of the portable electronic device while reducing undesired electromagnetic interference (EMI), and with
   the impedance detector sensing impedances based upon charger capacitive electrodes being within the device conductive footprint and communicating sensing data based thereon to said control circuit, and
   the control circuit using the sensing data to control said switching circuit to select the device capacitive electrodes to receive a charging signal from said charging signal generator.

7. The charger according to claim 6 wherein said charger controller sequentially drives said charger capacitive electrodes with a sensing signal to sense impedances thereof.

8. The charger according to claim 7 wherein the charging signal has an amplitude at least one hundred times greater than an amplitude of the sensing signal.

9. The charger according to claim 7 wherein said control circuit operates said charging signal generator at a reduced amplitude to serve as a signal generator for the sensing signal.

10. A charger for capacitively charging a battery in a portable electronic device when the portable electronic device is temporarily placed adjacent the charger, the charger comprising:
- a base having an area larger than the portable electronic device and able to receive the portable electronic device thereon in a plurality of different positions;
- an array of charger capacitive electrodes carried by said base; and
- a charger controller including a charging signal generator, a switching circuit connected between said charging signal generator and said charger capacitive electrodes, a control circuit connected to said switching circuit, a buffer connected between said charging signal generator and said switching circuit, and an impedance detector connected to said buffer and said control circuit;
- the charger controller for selectively driving said charger capacitive electrodes with a charging signal sufficient to capacitively charge the battery of the portable electronic device and not driving charger capacitive electrodes not covered by the portable electronic device with the charging signal when the portable electronic device is positioned on said charger, and with
  - the impedance detector sensing impedances based upon charger capacitive electrodes being within the device conductive footprint and communicating sensing data based thereon to said control circuit, and
  - the control circuit using the sensing data to control said switching circuit to select the device capacitive electrodes to receive a charging signal from said charging signal generator.

11. The charger according to claim 10 wherein said charger controller sequentially drives said charger capacitive electrodes with a sensing signal to sense impedances thereof.

12. The charger according to claim 11 wherein the charging signal has an amplitude at least one hundred times greater than an amplitude of the sensing signal.

13. The charger according to claim 11 wherein said control circuit operates said charging signal generator at a reduced amplitude to serve as a signal generator for the sensing signal.

14. A method of capacitively charging a portable electronic device with a charger, the portable electronic device comprising a housing, a battery carried by the housing, and at least one pair of device capacitive electrodes carried by the housing for charging the battery and defining a device conductive footprint, and the charger comprising a base having an area larger than the device conductive footprint and able to receive the portable electronic device thereon in a plurality of different positions, an array of charger capacitive electrodes carried by the base, and a charger controller connected to the charger capacitive electrodes, the method comprising:
- temporarily placing the portable electronic device adjacent the charger; and
- selectively driving, via the charger controller, the charger capacitive electrodes within the device conductive footprint with a charging signal sufficient to capacitively charge the battery of the portable electronic device and not driving charger capacitive electrodes outside the device conductive footprint with the charging signal to thereby capacitively charge the battery of the portable electronic device while reducing undesired electromagnetic interference (EMI), the charger controller including a charging signal generator, a switching circuit connected between the charging signal generator and the charger capacitive electrodes, a control circuit connected to the switching circuit, a buffer connected between the charging signal generator and the switching circuit, and an impedance detector connected to the buffer and the control circuit;
- the impedance detector sensing impedances based upon charger capacitive electrodes being within the device conductive footprint and communicates sensing data based thereon to the control circuit; and
- the control circuit using the sensing data to control the switching circuit to select the device capacitive electrodes to receive a charging signal from the charging signal generator.

15. The method according to claim 14 further comprising sequentially driving, via the charger controller, the charger capacitive electrodes with a sensing signal to sense impedances thereof.

16. The method according to claim 15 wherein the charging signal has an amplitude at least one hundred times greater than an amplitude of the sensing signal.

* * * * *